F. TURNBULL.
MOTOR VEHICLE.
APPLICATION FILED FEB. 25, 1918.
1,317,465.
Patented Sept. 30, 1919.
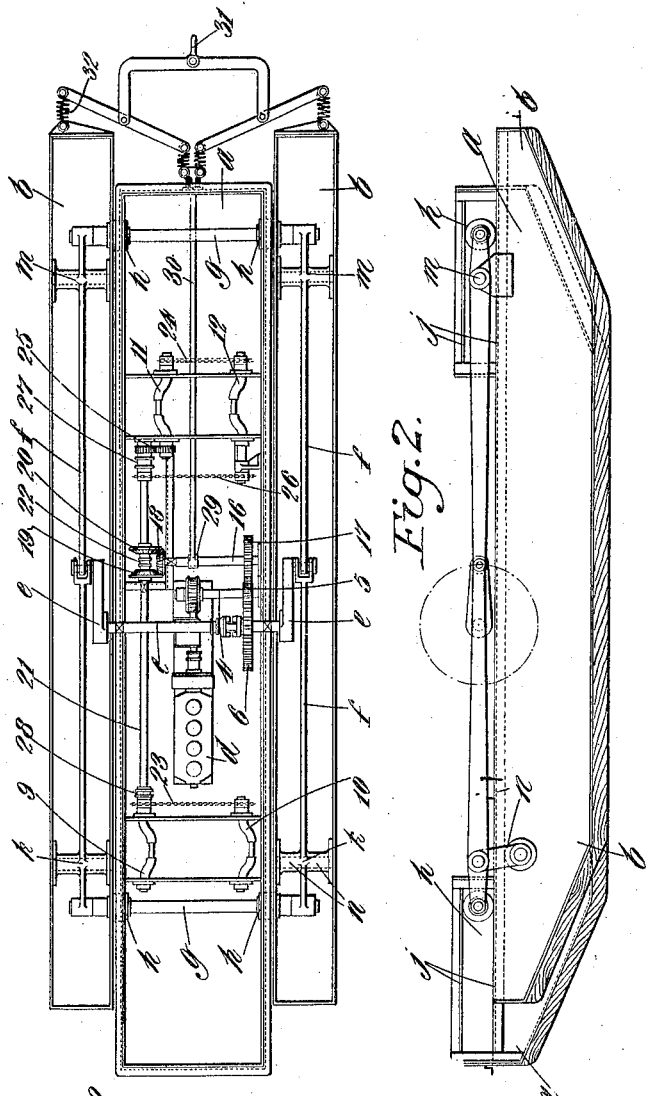
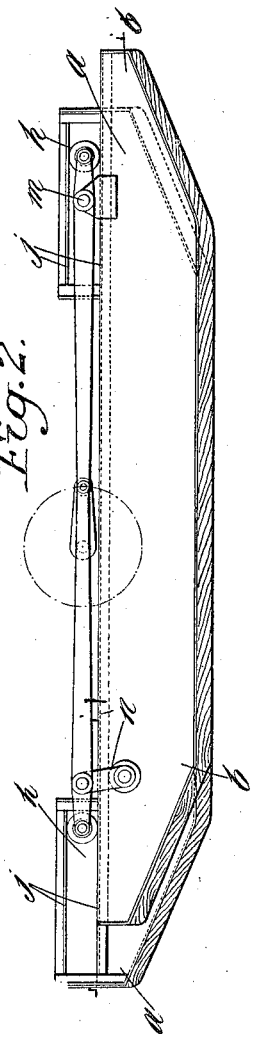
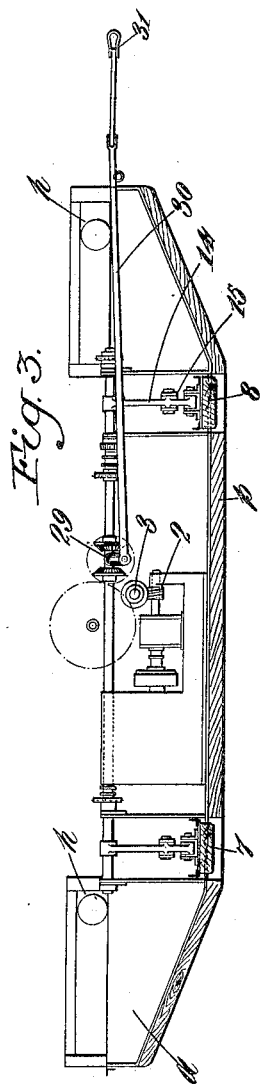
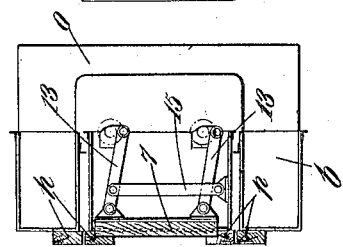
INVENTOR:
Frederick Turnbull
Wm Wallace White
ATTY.

UNITED STATES PATENT OFFICE.

FREDERICK TURNBULL, OF NEWCASTLE-UPON-TYNE, ENGLAND.

MOTOR-VEHICLE.

1,317,465.     Specification of Letters Patent.     Patented Sept. 30, 1919.

Application filed February 25, 1918. Serial No. 219,123.

*To all whom it may concern:*

Be it known that I, FREDERICK TURNBULL, of 2 Stannington Grove, Heaton, Newcastle-upon-Tyne, England, have invented certain new and useful Improved Motor-Vehicles, of which the following is a specification.

This invention relates to motor vehicles of the type comprising a body part and bearers adapted to bear on the ground, a reciprocating member supported on the body part, a crank shaft on the body part adapted to be rotated, connecting rods between the reciprocating member and the cranks, connecting links between the connecting rods and the bearers whereby when the crank shaft is rotated the bearers are raised off the ground, moved forward and lowered.

The object of this invention is to provide an improved vehicle of this type especially adapted for use on soft or rough ground, sand or snow, and capable of crossing broken ground, ditches, trenches and the like and of surmounting obstacles.

A vehicle made in accordance with this invention comprises a central part and side parts each forming bearers adapted to bear on the ground, reciprocating members disposed at each end of the central part, said reciprocating members being connected to a crank shaft disposed centrally of the machine, the arrangement being such that as the crank shaft is rotated the central part and side parts are raised off the ground, moved forward and lowered alternately.

Referring to the drawings filed herewith:—

Figure 1 is a plan of one form of vehicle made in accordance with this invention.

Fig. 2 is a side elevation.

Fig. 3 is a longitudinal section of the central member.

Fig. 4 is a cross section showing the steering pedals.

$a$ is a central flat-bottomed member and $b$ $b$ two side members, one on each side of the central member. Each side member in the example shown is of less than half the width of the central member. Transversely across the central member at or about midway of its length is mounted a shaft $c$ rotated through suitable gearing by a motor $d$ operated by gas, oil, steam, electricity or other convenient source of power. At each end of the transverse shaft $c$ is fixed a crank $e$ which is connected by forwardly and rearwardly extending rods $f$ to front and rear crosshead shafts $g$ fitted with blocks or rollers $h$ adapted to slide between guide members $j$ carried by the central member $a$ of the vehicle. Rotation of the crank shaft reciprocates said block rectilinearly in said guide members. Conveniently the guide members may be formed by slots in the side walls of the central member, and they may be provided with roller or ball bearings or other antifriction devices. There are thus a pair of cranks, one at each side of the central member of the vehicle, similarly mounted on a common transverse rotary shaft, a front and rear pair of connecting rods, and a front and a rear reciprocating crosshead shaft fitted with guide blocks or rollers $h$. Each side member is pivotally connected to gudgeons $k$ $m$ carried by the front and rear connecting rods respectively. $n$ $n$ are links to allow for adjustment with respect to the gudgeons $m$ $m$ which are fixed to the side members.

It will be seen that, upon rotation of the crank shaft, one portion (say the side members) of the vehicle will be lifted off the ground, while the central member remains stationary, and the side member will be moved forward owing to the coaction of the connecting rods, guide blocks and links, the crosshead shaft $g$ supported by the central member which rests on the ground acting as fulcra during the movement of the side members. Further rotation of the crank shaft lowers the side members on to the ground a distance in advance of their original position equal to twice the throw of the cranks, and the central member is then lifted, moved forward and lowered, the gudgeons supported by the side members resting on the ground acting as fulcra during the movement of the central member. Each rotation of the crank shaft thus causes first the central member and then the side members of the vehicle (or vice versa) to take a step forward.

The distance which the vehicle members are raised off the ground is controlled by the position of the gudgeons $k$ and $m$ relatively to the adjacent crosshead shafts; the nearer the gudgeons are to said shafts the less the lift. If desired, the gudgeons may be mounted so as to be capable of adjustment to vary the lift.

One characteristic feature of my improved construction is the arrangement of the guide blocks and guide members, the latter forming endless paths for the former.

The two side members are preferably braced by bridge pieces *o* connecting them together. The bottoms of the central and side members are flat, but their front ends are upwardly inclined so that the vehicle tends to mount and ride over obstacles. Treads of wood, india rubber or the like material may be provided if desired on the bottoms of the vehicle members to prevent slipping, and to reduce vibration, and in some cases the treads *p* may comprise projections hinged so as to be free to swing in one direction only, adapted to enter the ground and oppose rearward motion of the vehicle but allow forward motion thereof.

The means shown in the drawings for driving the crank shaft *c* comprise a worm 2 gearing with a worm wheel 3 mounted on a shaft 4 carrying a pinion 5 which gears with the toothed wheel 6 on the crank shaft, but any suitable gearing may be provided for transmitting the motion of the engine to the crank shaft. The means for steering the vehicle comprises fore and aft treads 7, 8, disposed transversely on the vehicle connected to cranks 9, 10 and 11, 12 by links 13 and 14 respectively. One of the links connected to the fore tread and one of the links connected to the aft tread are connected by a link 15 to the side members, so that a greater vertical than horizontal movement is imparted to the pedals. By these means the vehicle will be lifted only a small amount and have a short horizontal stroke while on account of its high vertical stroke giving ample clearance for the vehicle to clear any obstacle encountered in the middle of the vehicle path.

The cranks 9, 10, 11 and 12 are adapted to be driven from the shaft 4 by a shaft 16 provided with a toothed wheel 17 gearing with the pinion 5. On the shaft 16 is a beveled pinion 18 gearing with beveled pinions 19 and 20 adapted to be run free on the shaft 21 or to be connected thereto by the clutch 22 so as to drive the shaft 21 in either direction. The cranks 9 and 10 are connected together by a sprocket chain gear 23 and the cranks 11 and 12 are connected by sprocket chain gear 24. The shaft 21 is provided with a toothed pinion 25 adapted to drive the cranks 11 and 12 in one direction and is provided with sprocket wheel and chain gear 26 adapted to drive the cranks 11 and 12 in the opposite direction according to the position of the clutch 27. Upon the shaft 21 is a clutch coupling 28 for connecting and disconnecting the crank 9.

The teeth of the clutches shown are so disposed that they engage their respective gear wheels in such a manner that the lifting motion of the longitudinal and transverse pedals act at the same time when the transverse pedals are at work. For instance the main cranks *e* and the steering cranks 9, 10, 11 and 12 are all shown horizontal in the drawings. No matter how much the clutches are engaged and disengaged the relation shown will be maintained when engaged together and is such that when the vehicle is moving say forward and the clutches for turning to either hand are put in gear, the pedals will only come in contact with the ground while the main cranks are engaged in lifting the side portions of the vehicle. It will be obvious that if the side pieces were resting on the ground and the middle was in the up position the pedals could not effect any side motion without a greatly increased stroke.

The fore and aft pedals in addition to steering to right and left can be used for propelling the vehicle sidewise. This is effected by unclutching the main spur gear on the main crank shaft (which puts the main cranks out of action), disengaging the aft pedal 24 and driving chain engaging the aft chain 26 with the shaft 21, so that cranks 11 and 12 are driven from the shaft 21 through the chain 26. All pedal cranks will then revolve in the same direction and will lift and move the vehicle sidewise a short distance for each rotation. The direction right or left that the side step will take is controlled by the clutch 22 working the bevel gears 19, 20.

By similar means the vehicle is made to turn on a vertical axis about its center, only instead of engaging the wheels driven by chain 26, the spur gear 25 is engaged.

It will be noted that if only the fore or only the rear pedal is working the turning angle will be only half that if both were engaged.

The whiffle trees at the rear of the vehicle in conjunction with crank 29 on the shaft 16 and connecting rod 30 are for the purpose of providing means for imparting an approximately uniform pull on any load that may be hauled by this motor vehicle.

When the main cranks are in action but in the horizontal position there would be a momentary stop in the forward motion of all parts of the vehicle including the coupling 31 if there were no hauling crank 29, but just at this moment the said hauling crank 29 is exerting its maximum forward speed and this prevents any stoppage of the coupling 31, and therefore of the load to be hauled. The hauling crank shaft 29 makes two rotations to one of the main cranks so that when the latter are exerting their greatest speed (that is when vertical) on the coupling 31, the hauling crank pin is, relatively, going backward, thus tending to reduce the speed of the coupling 31. Springs 32 are provided for cushioning the strain.

My improved vehicle may be readily adapted for military purposes and may be provided with an inclosing casing of armor plating, in which case it may carry guns and the like adapted to fire through apertures in the armor plating.

By rendering the lower portion of the central member of the vehicle watertight, the vehicle may be adapted to cross canals and rivers, suitable means (such for example as paddle wheels or propellers) being provided, if desired, for propelling it through the water.

It will be seen that the weight of the vehicle is distributed over the bottoms of the central member and side members alternately which have a comparatively large surface area. The vehicle is thus particularly adapted for crossing soft marshy ground, sand or snow. As there is no forward movement until the moving member has been lifted clear of the ground, the roughness of the ground will but slightly affect the progress of the vehicle. Moreover, as the pressure of the vehicle is downward chiefly, it will tend to improve the road surface and to make a road where none exists. The vehicle is capable of bridging over and of crossing trenches or ditches of considerable width, the maximum width of course depending upon the length of the vehicle.

What I claim as my invention and desire to secure by Letters Patent is:—

1. A vehicle comprising a body part adapted to bear on the ground, a reciprocating member supported on the body part, a crank shaft disposed centrally of the body part, means for rotating said shaft, connecting rods between the reciprocating member and cranks, bearers disposed on each side of the body part, connecting links between the connecting rods and the bearers whereby when the crank shaft is rotated the body part and side are raised off the ground, moved forward and lowered alternately.

2. A vehicle as claimed in claim 1, having pedals disposed transversely of the vehicle adapted to bear on the ground, and means for raising the pedals off the ground, moving them forward and lowering them on to the ground for the purpose of moving the vehicle sidewise.

3. A vehicle as claimed in claim 1 in combination with a coupling hook and means for converting the intermittent motion of the vehicle into approximately uniform motion at the coupling hook.

In testimony whereof I have signed my name to this specification.

FREDERICK TURNBULL.

Witnesses:
WM. COLEMAN,
A. I. CHARLTON.

Copies of this patent may be obtained for five cents each, by addressing the "Commissioner of Patents, Washington, D. C."